United States Patent
Schmidt et al.

(10) Patent No.: US 7,709,614 B2
(45) Date of Patent: May 4, 2010

(54) CRYSTALLINE MODIFICATIONS OF C.I. PIGMENT YELLOW 181 AND ASSOCIATED PRODUCTION METHOD

(75) Inventors: Martin U. Schmidt, Frankfurt am Main (DE); Gerald Mehltretter, Wiesbaden (DE)

(73) Assignee: Clariant Produkte (Deutschland) GmbH, Frankfurt (DE)

( * ) Notice: Subject to any disclaimer, the term of this patent is extended or adjusted under 35 U.S.C. 154(b) by 700 days.

(21) Appl. No.: 11/631,587

(22) PCT Filed: Jun. 15, 2005

(86) PCT No.: PCT/EP2005/006405

§ 371 (c)(1), (2), (4) Date: Jan. 4, 2007

(87) PCT Pub. No.: WO2006/005408

PCT Pub. Date: Jan. 19, 2006

(65) Prior Publication Data

US 2008/0058531 A1    Mar. 6, 2008

(30) Foreign Application Priority Data

Jul. 9, 2004    (DE) ................... 10 2004 033 287

(51) Int. Cl.
*C09B 67/48*    (2006.01)
(52) U.S. Cl. .................. 534/575; 534/742; 534/887; 106/496
(58) Field of Classification Search .............. None
See application file for complete search history.

(56) References Cited

U.S. PATENT DOCUMENTS

| | | | |
|---|---|---|---|
| 4,302,389 A | 11/1981 | Hunger et al. | |
| 4,504,416 A | 3/1985 | Hunger et al. | |
| 6,274,728 B1 | 8/2001 | Hal-Goulle et al. | |
| 6,504,045 B2 | 1/2003 | Jung et al. | |
| 6,562,121 B2 | 5/2003 | Nichel et al. | |
| 6,835,242 B2 | 12/2004 | Nickel et al. | |
| 2002/0077387 A1* | 6/2002 | Schmidt et al. | 523/161 |

FOREIGN PATENT DOCUMENTS

| | | |
|---|---|---|
| EP | 0010273 | 4/1980 |
| EP | 1167461 | 1/2002 |
| GB | 1393379 | 5/1975 |

OTHER PUBLICATIONS

PCT International Search Report for PCT/EP 2005/006405, mailed Sep. 23, 2005.
English Translation of PCT International Preliminary Report on Patentability for PCT/EP 2005/006405, mailed Mar. 31, 2007.

* cited by examiner

*Primary Examiner*—Fiona T Powers
(74) *Attorney, Agent, or Firm*—Anthony A. Bisulca

(57) ABSTRACT

Novel crystalline modifications (eta, theta, iota, kappa) of the C.I. Pigment Yellow 181, obtained when one of the known phases or another inventive phase of said pigment is treated with specific solvents. The novel crystalline phases are characterized by yellow shades and excellent coloring properties.

21 Claims, No Drawings

CRYSTALLINE MODIFICATIONS OF C.I. PIGMENT YELLOW 181 AND ASSOCIATED PRODUCTION METHOD

The present invention relates to four novel crystalline modifications (eta, theta, iota, kappa) of C.I. Pigment Yellow 181 of the formula (1), their preparation and use as pigments.

C.I. Pigment Yellow 181 (hereinafter: P.Y. 181) refers to the compound of the formula (1) which results from a coupling reaction of diazotized 4-(4'-aminobenzoylamino)benzamide with 5-acetoacetylaminobenzimidazolone (acetolone).

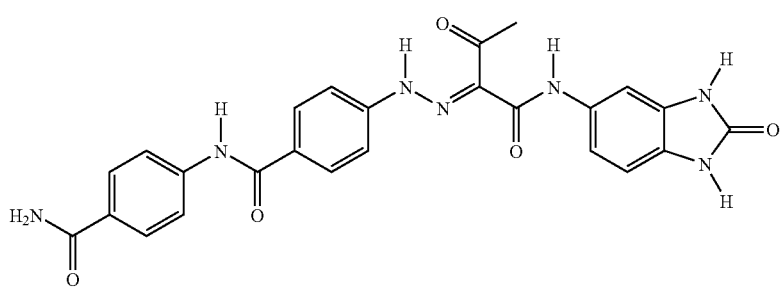

(1)

In the solid state, compound (1) can also exist in another tautomeric and/or cis-trans isomeric form and, if appropriate, additionally contain water molecules, typically up to 10% by weight.

Most organic pigments exist in a plurality of different crystalline modifications, also known as phases. Crystalline modifications have the same chemical composition, but a different arrangement of the building blocks (molecules or ions) in the crystal. It is the crystal structure which determines chemical and physical properties, and so the individual crystalline modifications often differ in rheology, color and other coloristic properties. Different crystalline modifications can be identified through x-ray powder diffractometry.

P.Y. 181 is hitherto known to have six crystalline modifications. They are referred to hereinbelow as alpha, beta, gamma, delta, epsilon and zeta. They feature the following characteristic lines in the x-ray powder diagram (Cu-$K_{\alpha 1}$ radiation, doubled diffraction angle 2Θ in degrees, d values in $Å^{-1}$ in degrees, lattice plane spacings d in $Å^{-1}$):

| 2Θ | d | rel. intensity | |
|---|---|---|---|
| alpha modification: (all lines relatively broad) | | | |
| 12.05 | 7.3 | 39 | |
| 12.66 | 7.0 | 49 | |
| 14.05 | 6.3 | 33 | shoulder |
| 14.71 | 6.0 | 40 | |
| 15.62 | 5.7 | 26 | shoulder |
| 17.41 | 5.1 | 22 | |
| 19.90 | 4.5 | 20 | |
| 20.50 | 4.3 | 30 | |
| 22.47 | 4.0 | 31 | |
| 25.57 | 3.5 | 49 | shoulder |
| 26.54 | 3.4 | 100 | |
| 28.98 | 3.1 | 21 | |
| beta modification: | | | |
| 4.15 | 21.3 | 4 | |
| 8.30 | 10.6 | 6 | |
| 10.92 | 8.1 | 2 | |
| 12.50 | 7.1 | 3 | |
| 13.99 | 6.3 | 12 | |
| 16.75 | 5.3 | 22 | |
| 17.54 | 5.1 | 32 | |
| 18.38 | 4.8 | 82 | |
| 19.19 | 4.6 | 31 | |
| 19.48 | 4.6 | 47 | |
| 19.75 | 4.5 | 40 | |
| 21.90 | 4.1 | 73 | |
| 22.19 | 4.0 | 31 | |
| 23.12 | 3.8 | 13 | |
| 24.52 | 3.6 | 11 | |
| 24.94 | 3.6 | 9 | |
| 25.35 | 3.5 | 93 | |
| 26.74 | 3.3 | 7 | |
| 27.75 | 3.2 | 7 | |
| 28.43 | 3.1 | 100 | |
| 29.96 | 3.0 | 9 | |
| 31.87 | 2.8 | 10 | |
| gamma modification: | | | |
| 8.48 | 10.4 | 36 | |
| 8.72 | 10.1 | 37 | |
| 9.55 | 9.3 | 35 | |
| 10.06 | 8.8 | 78 | |
| 10.28 | 8.6 | 49 | |
| 11.63 | 7.6 | 48 | |
| 12.76 | 6.9 | 52 | |
| 13.61 | 6.5 | 32 | |
| 16.17 | 5.5 | 77 | |
| 17.11 | 5.2 | 35 | |
| 18.68 | 4.7 | 64 | |
| 19.42 | 4.6 | 58 | |
| 24.48 | 3.6 | 100 | |
| 25.00 | 3.6 | 83 | |
| 25.98 | 3.4 | 49 | |
| 27.07 | 3.3 | 65 | |
| 29.83 | 3.0 | 36 | |
| delta modification: | | | |
| 7.60 | 11.6 | 13 | |
| 8.23 | 10.7 | 100 | |
| 8.74 | 10.1 | 12 | |
| 8.87 | 10.0 | 11 | |
| 9.89 | 8.9 | 15 | |
| 12.40 | 7.1 | 20 | |
| 15.41 | 5.7 | 18 | |
| 15.60 | 5.7 | 14 | |
| 16.56 | 5.3 | 58 | |
| 17.24 | 5.1 | 33 | |

-continued

| 2Θ | d | rel. intensity | |
|---|---|---|---|
| 17.77 | 5.0 | 16 | |
| 18.24 | 4.9 | 15 | |
| 19.72 | 4.5 | 14 | |
| 22.31 | 4.0 | 14 | |
| 22.53 | 3.9 | 15 | |
| 23.96 | 3.7 | 20 | |
| 24.25 | 3.7 | 15 | |
| 24.97 | 3.6 | 15 | |
| 25.27 | 3.5 | 15 | |
| 25.80 | 3.4 | 15 | shoulder |
| 26.26 | 3.4 | 100 | |
| 26.60 | 3.3 | 33 | |
| 27.19 | 3.3 | 11 | shoulder |
| 28.39 | 3.1 | 12 | |
| epsilon modification: | | | |
| 7.48 | 11.8 | 28 | |
| 10.60 | 8.3 | 79 | |
| 11.22 | 7.9 | 28 | |
| 11.88 | 7.4 | 75 | |
| 13.66 | 6.5 | 20 | |
| 13.93 | 6.4 | 86 | |
| 14.59 | 6.1 | 18 | |
| 14.98 | 5.9 | 27 | |
| 16.02 | 5.5 | 19 | |
| 16.43 | 5.4 | 29 | |
| 16.85 | 5.3 | 25 | |
| 17.28 | 5.1 | 19 | |
| 18.78 | 4.7 | 26 | |
| 19.66 | 4.5 | 32 | |
| 20.15 | 4.4 | 51 | |
| 20.83 | 4.3 | 26 | |
| 22.56 | 3.9 | 17 | |
| 25.66 | 3.5 | 84 | shoulder |
| 25.82 | 3.4 | 100 | |
| 26.31 | 3.4 | 39 | shoulder |
| 27.44 | 3.2 | 25 | |
| 28.38 | 3.1 | 17 | |
| 28.99 | 3.1 | 12 | |
| 30.75 | 2.9 | 13 | |
| zeta modification: | | | |
| 3.82 | 23.1 | 54 | |
| 7.64 | 11.6 | 23 | |
| 11.95 | 7.4 | 100 | |
| 13.23 | 6.7 | 35 | |
| 14.77 | 6.0 | 23 | |
| 15.11 | 5.9 | 24 | |
| 15.41 | 5.7 | 24 | |
| 18.19 | 4.9 | 40 | |
| 23.68 | 3.8 | 22 | |
| 26.66 | 3.3 | 98 | |
| 28.09 | 3.2 | 29 | |

All line positions are given with an uncertainty of ±0.2°.

P.Y. 181 in the alpha phase is obtained on coupling the diazonium salt of 4-(4'-aminobenzoylamino)benzamide with 5-acetoacetylaminobenzimidazolone (acetolone).

The beta phase is obtained on treating the as-coupled P.Y. 181 with dimethylformamide in accordance with the directions in Example 1 of EP-A-0 010 273.

The gamma phase is obtained on performing the coupling in pyridine and then heating the reaction mixture under reflux.

The delta phase is obtained by treating P.Y. 181 in the beta modification with dimethyl sulfoxide. In the course of the treatment, P.Y. 181 in the beta phase is dissolved in DMSO at 200° C. and is made to precipitate back out again by subsequently lowering the temperature.

The epsilon phase is obtained in a similar manner by treatment with N-methylpyrrolidone.

The zeta phase is obtained on performing the coupling in a mixture of water and N-methylpyrrolidone and then heating the reaction mixture under reflux.

It has now been found that, surprisingly, P.Y. 181 is preparable in four novel crystalline modifications when the as-synthesized pigment is heated in certain solvents, the pigment, partially or completely, dissolving and subsequently precipitating back out again. The novel crystalline modifications are referred to as eta, theta, iota and kappa.

They feature the following characteristic lines (Cu-Kα$_1$ radiation, 2Θ values in degrees, d values in Å$^{-1}$, measured at room temperature in transmission):

| 2Θ | d | rel. intensity | |
|---|---|---|---|
| eta modification: | | | |
| 9.06 | 9.8 | 39 | |
| 11.05 | 8.0 | 22 | |
| 12.67 | 7.0 | 32 | |
| 14.30 | 6.2 | 65 | |
| 15.54 | 5.7 | 47 | |
| 15.89 | 5.6 | 36 | |
| 18.67 | 4.7 | 37 | |
| 25.53 | 3.5 | 100 | |
| theta modification: | | | |
| 4.80 | 18.4 | 11 | |
| 9.60 | 9.2 | 28 | |
| 12.27 | 7.2 | 19 | |
| 14.44 | 6.1 | 27 | |
| 15.60 | 5.7 | 19 | |
| 17.40 | 5.1 | 36 | |
| 19.15 | 4.6 | 27 | |
| 19.71 | 4.5 | 14 | |
| 22.89 | 3.9 | 26 | |
| 26.55 | 3.4 | 100 | |
| iota modification: | | | |
| 8.69 | 10.2 | 52 | broad |
| 10.23 | 8.6 | 89 | |
| 13.51 | 6.5 | 58 | |
| 19.04 | 4.7 | 40 | |
| 20.31 | 4.4 | 43 | |
| 22.57 | 3.9 | 33 | |
| 25.63 | 3.5 | 63 | |
| 26.48 | 3.4 | 100 | |
| kappa modification: | | | |
| 17.48 | 5.1 | 100.0 | |
| 18.55 | 4.8 | 31.5 | |
| 21.74 | 4.1 | 53.0 | |
| 27.21 | 3.3 | 54.8 | broad |

All line positions are given with an uncertainty of ±0.2°.

As is common general knowledge, the number of observable peaks in an x-ray powder diagram depends in particular on crystallite size distribution, the anisotropy of the particulate form, the anisotropic crystalline quality (in particular with regard to stress, strain and crystal defects), on sample quantity, the diffractometer used and on the measuring geometry. The intensities in all cases additionally depend on texture effects, in particular in the case of an anisotropic crystallite form, and on the method used to extract the intensities. Under favorable preconditions, the following lines can be observed (Cu-Kα$_1$ radiation, 2Θ values in degrees, d values in Å$^{-1}$, measured at room temperature in transmission):

| 2Θ | d | rel. intensity |
|---|---|---|
| eta modification: | | |
| 9.06 | 9.8 | 39 |
| 11.05 | 8.0 | 22 |

| 2Θ | d | rel. intensity | |
|---|---|---|---|
| 12.67 | 7.0 | 32 | |
| 13.34 | 6.6 | 17 | |
| 14.30 | 6.2 | 65 | |
| 14.43 | 6.1 | 56 | shoulder |
| 15.11 | 5.9 | 18 | |
| 15.54 | 5.7 | 47 | |
| 15.89 | 5.6 | 36 | |
| 16.47 | 5.4 | 22 | |
| 16.79 | 5.3 | 21 | |
| 18.20 | 4.9 | 28 | |
| 18.67 | 4.7 | 37 | |
| 19.44 | 4.6 | 20 | |
| 20.79 | 4.3 | 25 | |
| 21.62 | 4.1 | 17 | |
| 24.03 | 3.7 | 20 | |
| 24.72 | 3.6 | 33 | shoulder |
| 25.13 | 3.5 | 48 | shoulder |
| 25.53 | 3.5 | 100 | |
| 26.03 | 3.4 | 31 | shoulder |
| 26.62 | 3.3 | 25 | |
| 27.27 | 3.3 | 24 | |
| 28.45 | 3.1 | 17 | |
| 29.52 | 3.0 | 12 | |
| 30.57 | 2.9 | 11 | |
| theta modification: | | | |
| 4.80 | 18.4 | 11 | |
| 9.60 | 9.2 | 28 | |
| 10.60 | 8.3 | 5 | |
| 10.94 | 8.1 | 6 | |
| 11.62 | 7.6 | 8 | |
| 12.27 | 7.2 | 19 | |
| 12.64 | 7.0 | 10 | |
| 12.96 | 6.8 | 12 | |
| 14.03 | 6.3 | 11 | |
| 14.44 | 6.1 | 27 | |
| 14.85 | 6.0 | 12 | |
| 15.60 | 5.7 | 19 | |
| 17.40 | 5.1 | 36 | |
| 18.16 | 4.9 | 9 | |
| 18.82 | 4.7 | 14 | |
| 19.15 | 4.6 | 27 | |
| 19.71 | 4.5 | 14 | |
| 20.09 | 4.4 | 6 | |
| 20.61 | 4.3 | 9 | |
| 21.22 | 4.2 | 8 | |
| 21.99 | 4.0 | 11 | |
| 22.65 | 3.9 | 14 | |
| 22.89 | 3.9 | 26 | |
| 23.43 | 3.8 | 8 | |
| 24.16 | 3.7 | 10 | |
| 24.71 | 3.6 | 13 | |
| 25.23 | 3.5 | 7 | |
| 25.78 | 3.5 | 13 | |
| 26.55 | 3.4 | 100 | |
| 26.84 | 3.3 | 9 | shoulder |
| 27.23 | 3.3 | 10 | |
| 28.23 | 3.2 | 6 | |
| 29.27 | 3.0 | 6 | |
| 30.56 | 2.9 | 5. | |
| iota modification: | | | |
| 4.66 | 19.0 | 52 | |
| 8.41 | 10.5 | 46 | shoulder |
| 8.69 | 10.2 | 52 | |
| 9.01 | 9.8 | 51 | |
| 10.23 | 8.6 | 89 | |
| 12.29 | 7.2 | 38 | |
| 12.70 | 7.0 | 35 | |
| 13.51 | 6.5 | 58 | |
| 15.95 | 5.6 | 34 | |
| 16.59 | 5.3 | 40 | |
| 17.18 | 5.2 | 36 | |
| 18.12 | 4.9 | 33 | |
| 18.38 | 4.8 | 34 | |
| 19.04 | 4.7 | 40 | |
| 19.59 | 4.5 | 35 | |
| 20.31 | 4.4 | 43 | |
| 22.57 | 3.9 | 33 | |
| 24.28 | 3.7 | 26 | |
| 25.63 | 3.5 | 63 | |
| 26.48 | 3.4 | 100 | |
| 27.39 | 3.3 | 33 | shoulder |
| 28.41 | 3.1 | 24 | |
| 29.58 | 3.0 | 23. | |
| kappa modification: | | | |
| 6.13 | 14.4 | 14.7 | |
| 10.26 | 8.6 | 15.9 | |
| 12.35 | 7.2 | 12.6 | |
| 17.48 | 5.1 | 100.0 | |
| 18.55 | 4.8 | 31.5 | |
| 19.47 | 4.6 | 19.6 | shoulder |
| 21.74 | 4.1 | 53.0 | |
| 23.06 | 3.9 | 17.1 | |
| 23.55 | 3.8 | 15.4 | |
| 24.50 | 3.6 | 12.5 | |
| 27.01 | 3.4 | 45.8 | shoulder |
| 27.21 | 3.3 | 54.8 | |
| 28.41 | 3.1 | 16.1 | shoulder |
| 29.90 | 3.0 | 8.8. | |

All line positions are given with an uncertainty of ±0.2°.

The modifications of the present invention can additionally contain water molecules and solvent molecules in the crystal lattice, normally up to 10% by weight, based on total weight.

All four novel modifications are sparingly soluble and are notable for yellow hues and good coloristic properties.

The present invention accordingly provides a process for phase transformation of C.I. Pigment Yellow 181, which comprises subjecting the compound of the formula (1)

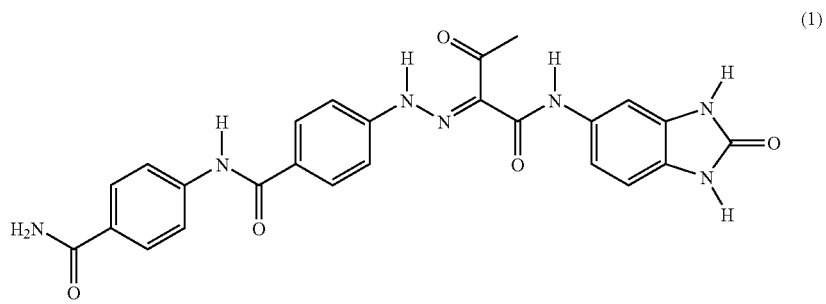

(1)

or a tautomer, a cis/trans isomer or a tautomeric cis/trans isomer of the formula (1) to the action of a solvent selected from the group consisting of water, dimethylacetamide, a mixture of dimethyl sulfoxide and N-methylpyrrolidone, and a mixture of 1,2-dichlorobenzene and N-methylpyrrolidone, at a temperature of 40 to 250° C. and preferably 110 to 210° C.

The starting material for preparing the novel crystalline phases is preferably P.Y. 181 in one of the known modifications, more preferably in the alpha modification or in the beta modification, but it is also possible for one or more of the novel crystalline modifications to be transformed into one of the other novel crystalline modifications using the measures described.

For this, the isolated P.Y. 181, for example in the α phase or in the β phase, is completely or partially dissolved, conveniently in the solvent of the present invention, and is subsequently precipitated back out again by addition of water, temperature reduction and/or evaporation of the solvent.

The pigment can be heated not only under atmospheric pressure but also under superatmospheric pressure, in which case the pressure can be between 1 bar and 200 bar and preferably between 1 bar and 50 bar.

The duration of the solvent treatment can advantageously be 1 minute to 10 hours and preferably 30 minutes to 5 hours.

The theta phase is obtained by recrystallization in a mixture of dimethyl sulfoxide and N-methylpyrrolidone. Here, P.Y. 181, the beta phase for example, is dissolved in a mixture of dimethyl sulfoxide and N-methylpyrrolidone in the mixing range from 25:75 percent by volume to 75:25 percent by volume, preferably in a mixing range from 40:60 to 60:40 percent by volume, preferably at a temperature between 150° C. and 200° C., and precipitated by subsequent temperature reduction and/or addition of water.

The eta phase is obtained in a similar manner on using a mixture of N-methylpyrrolidone and 1,2-dichlorobenzene in the mixing range from 25:75 percent by volume to 75:25 percent by volume, preferably in a mixing range from 40:60 to 60:40 percent by volume, as solvent.

The iota phase is obtained when P.Y. 181, for example the beta phase, is heated in dimethylacetamide, preferably to a temperature between 120 and 180° C., the suspension is filtered off and the filtrate is cooled to room temperature. The pigment crystallizes out from the solution.

The kappa phase is obtained when P.Y. 181, for example the alpha phase, is heated in water, preferably to a temperature of 110° C. to 150° C., in particular of 120° C. to 140° C., in a pressure reactor, advantageously for 1 minute up to 6 hours, preferably for 10 minutes to 2 hours. Longer heating is possible, but does not yield any technical advantages. Subsequently, the pigment is filtered off.

Depending on the purity of the starting materials, the concentrations, the employed temperatures and temperature trajectories, a possible aftertreatment, the pressure, the presence of impurities or additives, and the presence of seed crystals, the novel crystalline modifications are obtainable in pure form or as mixtures of the novel phases with each other and/or with the known phases.

A pure or substantially pure crystalline modification arises preferentially on proceeding from a solution or suspension already containing seed crystals or crystal nuclei of this modification and on performing the precipitation so slowly that supersaturation is maintained in a range in which the crystal growth rate is relatively high but the nucleation rate is relatively low, so that the crystal nuclei present grow with retention of the modification. The use of a mechanical stirrer may be advantageous, since it breaks existing crystals of the desired modification into many smaller fragments which then serve in turn as crystal nuclei for this modification (so-called secondary nucleation). When supersaturation is higher, for example because the solution is cooled more rapidly, the nucleation rate is much higher, so that many crystal nuclei of this modification and other modifications can arise spontaneously; this preferentially gives modification mixtures which consist only partly of the desired modification.

The preparation of a mixture of a plurality of the modifications according to the present invention or of one or more of the modifications according to the present invention with the known modifications can be of interest when certain coloristic and rheological properties are desired, in particular when there is a desire for properties which are between the properties of the pure modifications.

It is also possible to concentrate a mixture of various modifications to obtain a higher fraction of one phase or else a pure phase, for example by sifting, recrystallization, heat treatment, selective dissolution or extraction of the other modifications, or by repeated application of process measures of the present invention in which the formation of a specific phase is favored.

The present invention accordingly also provides a P.Y. 181 mixture containing at least 10%, preferably at least 25%, especially at least 50%, more preferably at least 75% and most preferably at least 90% of the eta modification, of the theta modification, of the iota modification, of the kappa modification or of a mixture of the modifications mentioned.

Depending on the desired field of use, it can be sensible to subject the resulting pigment to mechanical fine division. Fine division can be effected by wet or dry grinding or by kneading. Grinding or kneading can be followed by a treatment with a solvent, with water or with a solvent-water mixture to convert the pigment into a usable form.

To facilitate the change of modification, to stabilize the modifications of the present invention, to improve the coloristic properties and to obtain particular coloristic effects, it is possible to add pigment dispersants, surface-active agents, defoamers, extenders or other additives at any desired points of the process. It is also possible to use mixtures of these added materials. The added materials can be added all at once or in two or more portions. The materials can be added at any stage of the synthesis or of the various aftertreatments, or after the aftertreatments. The most suitable point in time has to be determined beforehand in rangefinding tests.

The P.Y. 181 in the modifications of the present invention or in mixtures containing the modifications of the present invention are useful for pigmentation of macromolecular organic materials of natural or synthetic origin, for example of coatings, plastics, resins, paints, printing inks, pigment formulations, in particular aqueous or solvent-containing pigment formulations, electrophotographic toners and developers, liquid inks, ink jet inks, color filters and electronic inks, and for coloration of seed. The modifications of the present invention are particularly useful for coloration of plastics films.

Electrophotographic toners and developers are one- or two-component powder toners (also known as one- or two-component developers), magnetic toners, liquid toners, latex toners, addition polymerization toners and also specialty toners, which are common general knowledge among those skilled in the art.

Typical toner binders are addition polymerization, polyaddition and polycondensation resins, such as styrene resins, styrene-acrylate resins, styrene-butadiene resins, acrylate resins, polyester resins, phenol-epoxy resins, polysulfones, polyurethanes, individually or combined, and also polyethylene and polypropylene, which can each contain further ingredients, such as charge control agents, waxes or flow auxiliaries, or are modified by these additions subsequently.

Ink jet inks refers to aqueous or nonaqueous ink jet inks, microemulsion inks and also hotmelt inks, which are common general knowledge among those skilled in the art.

EXAMPLES

In the examples which follow, parts and percentages are by weight. The crystalline modification of the products obtained was determined by x-ray powder diffractometry.

Example 1

Preparation of the Eta Phase by Recrystallization in 1,2-dichlorobenzene and NMP 24 parts of P.Y. 181 in the beta phase are completely dissolved in a mixture of 500 parts of 1,2-dichlorobenzene and 500 parts of N-methylpyrrolidone at the boil. The pigment is precipitated back out again from the solution by slow cooling to room temperature. This gives P.Y. 181 in the eta phase.

Example 2

Preparation of the Theta Phase by Recrystallization in DMSO and NMP

Example 1 is repeated using dimethyl sulfoxide instead of 1,2-dichlorobenzene. This gives P.Y. 181 in the theta phase.

Example 3

Preparation of the Iota Phase by Treatment with DMAc 30 parts of P.Y. 181 in the beta phase are heated with 160 parts of dimethylacetamide to the boil, the dimethylacetamide dissolving except for a small portion. The suspension is filtered off. The dissolved fraction of the pigment is gradually crystallized back out of the filtrate by cooling to room temperature. This gives P.Y. 181 in the iota phase.

Example 4

Preparation of the Kappa Phase by Pressure Treatment with Water 25 parts of P.Y. 181 in the alpha phase are heated with 500 parts of water in an autoclave at 140° C. for 120 minutes. The suspension is allowed to cool and the pigment is filtered off. The press cake is washed salt free and dried. This gives P.Y. 181 in the kappa phase.

Example 5

Preparation of the Kappa Phase by Pressure Treatment with Water and Subsequent Treatment with Glacial Acetic Acid 25 parts of P.Y. 181 in the alpha phase are heated with 500 parts of water in an autoclave at 140° C. for 120 minutes. The suspension is allowed to cool and the pigment is filtered off. The press cake is washed salt free and heated with 1400 parts of glacial acetic acid at 110° C. for 30 minutes. The pigment is filtered off and the press cake is washed with water and acetone. This gives P.Y. 181 in the kappa phase.

We claim:

1. A process for phase transformation of C.I. Pigment Yellow 181, comprising the step of subjecting the compound of the formula (1)

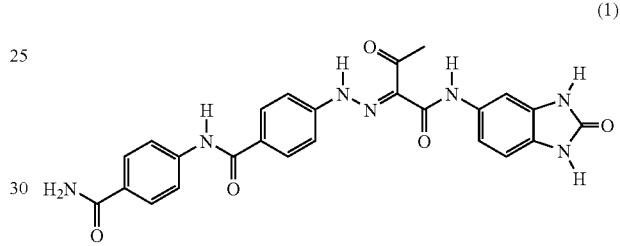

(1)

or a tautomer, a cis/trans isomer or a tautomeric cis/trans isomer of the formula (1) to the action of a solvent selected from the group consisting of dimethylacetamide, a mixture of dimethyl sulfoxide and N-methylpyrrolidone, and a mixture of 1,2-dichlorobenzene and N-methylpyrrolidone, at a temperature of 40 to 250° C.

2. The process as claimed in claim 1 wherein the solvent is allowed to act at a temperature of 110 to 210° C.

3. The process as claimed in claim 1 wherein the solvent is allowed to act at a pressure of 1 bar to 200 bar.

4. The process as claimed in claim 1, wherein the solvent is allowed to act for 1 minute to 10 hours.

5. The process as claimed in claim 1, wherein the compound of the formula (1) or a tautomer, a cis/trans isomer or a tautomeric cis/trans isomer of the formula (1) is wholly or partly dissolved in the solvent and subsequently precipitated by at least one of temperature reduction, addition of water or evaporation of the solvent.

6. C.I. Pigment Yellow 181 of the formula (1)

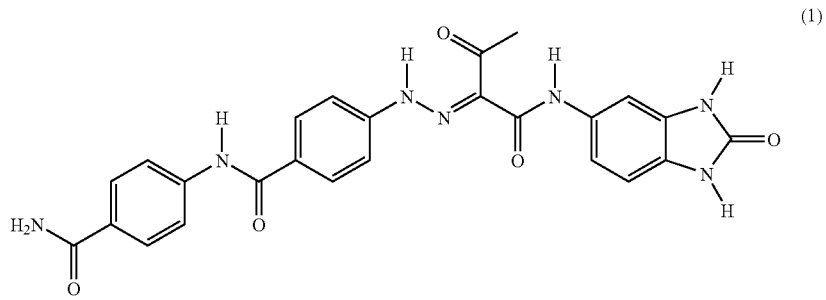

(1)

or a tautomeric, cis/trans isomeric or tautomeric cis/trans isomeric form thereof which optionally contains water molecules in the crystal lattice, wherein the C.I. Pigment Yellow 181 has the following characteristic signals in the x-ray powder diffractogram measured using Cu-K$\alpha_1$ radiation:

| 2Θ | d | rel. intensity | |
|---|---|---|---|
| \multicolumn{4}{c}{eta modification:} | | | |
| 9.06 | 9.8 | 39 | |
| 11.05 | 8.0 | 22 | |
| 12.67 | 7.0 | 32 | |
| 14.30 | 6.2 | 65 | |
| 15.54 | 5.7 | 47 | |
| 15.89 | 5.6 | 36 | |
| 18.67 | 4.7 | 37 | |
| 25.53 | 3.5 | 100; | |
| theta modification: | | | |
| 4.80 | 18.4 | 11 | |
| 9.60 | 9.2 | 28 | |
| 12.27 | 7.2 | 19 | |
| 14.44 | 6.1 | 27 | |
| 15.60 | 5.7 | 19 | |
| 17.40 | 5.1 | 36 | |
| 19.15 | 4.6 | 27 | |
| 19.71 | 4.5 | 14 | |
| 22.89 | 3.9 | 26 | |
| 26.55 | 3.4 | 100; | |
| iota modification: | | | |
| 8.69 | 10.2 | 52 | broad |
| 10.23 | 8.6 | 89 | |
| 13.51 | 6.5 | 58 | |
| 19.04 | 4.7 | 40 | |
| 20.31 | 4.4 | 43 | |
| 22.57 | 3.9 | 33 | |
| 25.63 | 3.5 | 63 | |
| 26.48 | 3.4 | 100; | |
| kappa modification: | | | |
| 17.48 | 5.1 | 100.0 | |
| 18.55 | 4.8 | 31.5 | |
| 21.74 | 4.1 | 53.0 | |
| 27.21 | 3.3 | 54.8 | broad; | or a mixture of these modifications.

7. The C.I. Pigment Yellow 181 of the formula (1) as claimed in claim 6 wherein the eta modification has the following signals:

| 2Θ | d | rel. intensity | |
|---|---|---|---|
| 9.06 | 9.8 | 39 | |
| 11.05 | 8.0 | 22 | |
| 12.67 | 7.0 | 32 | |
| 13.34 | 6.6 | 17 | |
| 14.30 | 6.2 | 65 | |
| 14.43 | 6.1 | 56 | shoulder |
| 15.11 | 5.9 | 18 | |
| 15.54 | 5.7 | 47 | |
| 15.89 | 5.6 | 36 | |
| 16.47 | 5.4 | 22 | |
| 16.79 | 5.3 | 21 | |
| 18.20 | 4.9 | 28 | |
| 18.67 | 4.7 | 37 | |
| 19.44 | 4.6 | 20 | |
| 20.79 | 4.3 | 25 | |
| 21.62 | 4.1 | 17 | |
| 24.03 | 3.7 | 20 | |
| 24.72 | 3.6 | 33 | shoulder |
| 25.13 | 3.5 | 48 | shoulder |
| 25.53 | 3.5 | 100 | |
| 26.03 | 3.4 | 31 | shoulder |
| 26.62 | 3.3 | 25 | |
| 27.27 | 3.3 | 24 | |
| 28.45 | 3.1 | 17 | |
| 29.52 | 3.0 | 12 | |
| 30.57 | 2.9 | 11. | |

8. The C.I. Pigment Yellow 181 of the formula (1) as claimed in claim 6 wherein the theta modification has the following signals:

| 2Θ | d | rel. intensity | |
|---|---|---|---|
| 4.80 | 18.4 | 11 | |
| 9.60 | 9.2 | 28 | |
| 10.60 | 8.3 | 5 | |
| 10.94 | 8.1 | 6 | |
| 11.62 | 7.6 | 8 | |
| 12.27 | 7.2 | 19 | |
| 12.64 | 7.0 | 10 | |
| 12.96 | 6.8 | 12 | |
| 14.03 | 6.3 | 11 | |
| 14.44 | 6.1 | 27 | |
| 14.85 | 6.0 | 12 | |
| 15.60 | 5.7 | 19 | |
| 17.40 | 5.1 | 36 | |
| 18.16 | 4.9 | 9 | |
| 18.82 | 4.7 | 14 | |
| 19.15 | 4.6 | 27 | |
| 19.71 | 4.5 | 14 | |
| 20.09 | 4.4 | 6 | |
| 20.61 | 4.3 | 9 | |
| 21.22 | 4.2 | 8 | |
| 21.99 | 4.0 | 11 | |
| 22.65 | 3.9 | 14 | |
| 22.89 | 3.9 | 26 | |
| 23.43 | 3.8 | 8 | |
| 24.16 | 3.7 | 10 | |
| 24.71 | 3.6 | 13 | |
| 25.23 | 3.5 | 7 | |
| 25.78 | 3.5 | 13 | |
| 26.55 | 3.4 | 100 | |
| 26.84 | 3.3 | 9 | shoulder |
| 27.23 | 3.3 | 10 | |
| 28.23 | 3.2 | 6 | |
| 29.27 | 3.0 | 6 | |
| 30.56 | 2.9 | 5. | |

9. The C.I. Pigment Yellow 181 of the formula (1) as claimed in claim 6 wherein the iota modification has the following signals:

| 2Θ | d | rel. intensity | |
|---|---|---|---|
| 4.66 | 19.0 | 52 | |
| 8.41 | 10.5 | 46 | shoulder |
| 8.69 | 10.2 | 52 | |
| 9.01 | 9.8 | 51 | |
| 10.23 | 8.6 | 89 | |
| 12.29 | 7.2 | 38 | |
| 12.70 | 7.0 | 35 | |
| 13.51 | 6.5 | 58 | |
| 15.95 | 5.6 | 34 | |
| 16.59 | 5.3 | 40 | |
| 17.18 | 5.2 | 36 | |
| 18.12 | 4.9 | 33 | |
| 18.38 | 4.8 | 34 | |
| 19.04 | 4.7 | 40 | |
| 19.59 | 4.5 | 35 | |
| 20.31 | 4.4 | 43 | |
| 22.57 | 3.9 | 33 | |
| 24.28 | 3.7 | 26 | |
| 25.63 | 3.5 | 63 | |
| 26.48 | 3.4 | 100 | |
| 27.39 | 3.3 | 33 | shoulder |
| 28.41 | 3.1 | 24 | |
| 29.58 | 3.0 | 23. | |

10. The C.I. Pigment Yellow 181 of the formula (1) as claimed in claim 6 wherein the kappa modification has the following signals:

| 2Θ | d | rel. intensity | |
|---|---|---|---|
| 6.13 | 14.4 | 14.7 | |
| 10.26 | 8.6 | 15.9 | |
| 12.35 | 7.2 | 12.6 | |
| 17.48 | 5.1 | 100.0 | |
| 18.55 | 4.8 | 31.5 | |
| 19.47 | 4.6 | 19.6 | shoulder |
| 21.74 | 4.1 | 53.0 | |
| 23.06 | 3.9 | 17.1 | |
| 23.55 | 3.8 | 15.4 | |
| 24.50 | 3.6 | 12.5 | |
| 27.01 | 3.4 | 45.8 | shoulder |
| 27.21 | 3.3 | 54.8 | |

-continued

| 2Θ | d | rel. intensity | |
|---|---|---|---|
| 28.41 | 3.1 | 16.1 | shoulder |
| 29.90 | 3.0 | 8.8. | |

11. A C.I. Pigment Yellow 181 mixture containing at least 10%, of one or more of the modifications defined in claim 6.

12. An article or composition pigmented by the C.I. Pigment Yellow 181 as claimed in claim 6, wherein the article or composition is selected from the group consisting of coatings, plastics, printing inks, paints, pigment formulations, aqueous or solvent-containing pigment formulations, electrophotographic toners, electrophotographic developers, powder coatings, liquid inks, ink jet inks, color filters, electronic inks and seed.

13. A process for phase transformation of C.I. Pigment Yellow 181, comprising the step of subjecting the compound of the formula (1)

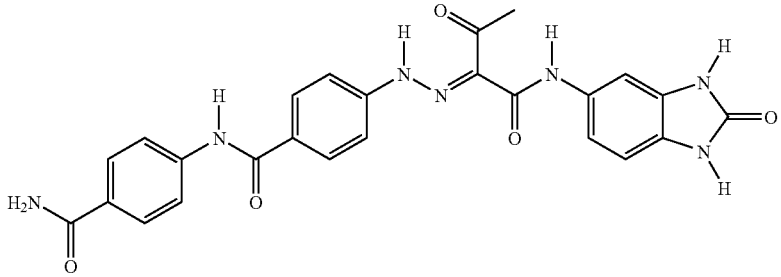

(1)

or a tautomer, a cis/trans isomer or a tautomeric cis/trans isomer of the formula (1) to the action of water at a temperature of 110 to 150° C. in a pressure reactor.

14. A C.I. Pigment Yellow 181 mixture containing at least 25 of one or more of the modifications defined in claim 6.

15. A C.I. Pigment Yellow 181 mixture containing at least 50% of one or more of the modifications defined in claim 6.

16. A C.I. Pigment Yellow 181 mixture containing at least 75% of one or more of the modifications defined in claim 6.

17. A C.I. Pigment Yellow 181 mixture containing at least 90% of one or more of the modifications defined in claim 6.

18. A C.I. Pigment Yellow 181 made in accordance with the process of claim 1.

19. An article or composition pigmented by the C.I. Pigment Yellow 181 as claimed in claim 18, wherein the article or composition is selected from the group consisting of coatings, plastics, printing inks, paints, pigment formulations, aqueous or solvent-containing pigment formulations, electrophotographic toners, electrophotographic developers, powder coatings, liquid inks, ink jet inks, color filters, electronic inks and seed.

20. A C.I. Pigment Yellow 181 made in accordance with the process of claim 13.

21. An article or composition pigmented by the C.I. Pigment Yellow 181 as claimed in claim 20, wherein the article or composition is selected from the group consisting of coatings, plastics, printing inks, paints, pigment formulations, aqueous or solvent-containing pigment formulations, electrophotographic toners, electrophotographic developers, powder coatings, liquid inks, ink jet inks, color filters, electronic inks and seed.

* * * * *